Figure 1:
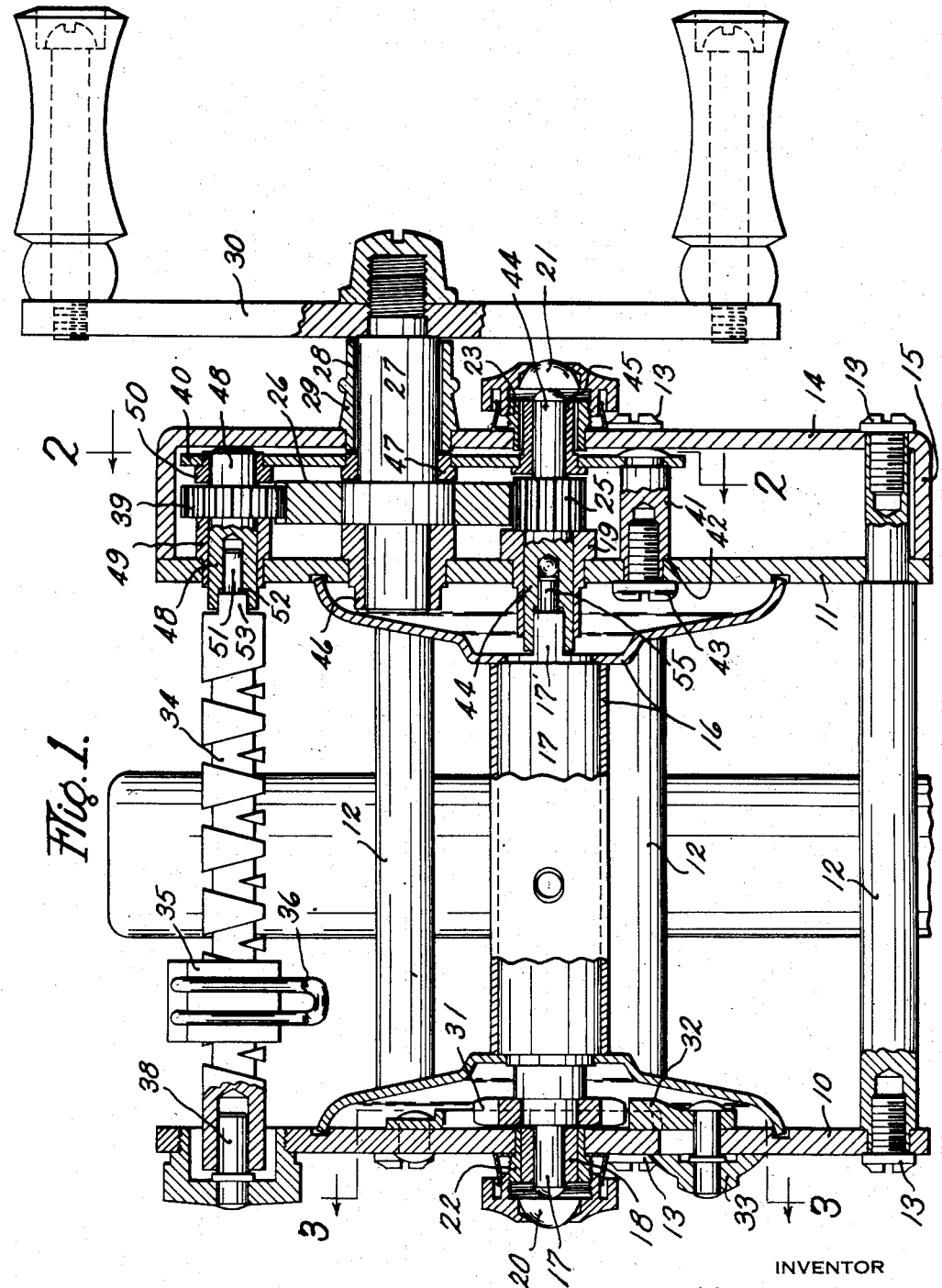

June 11, 1940.  J. M. DAYTON  2,204,125
FISHING REEL
Filed June 2, 1939   2 Sheets-Sheet 1

INVENTOR
JAMES M. DAYTON
BY
Chapin + Neal.
ATTORNEYS

June 11, 1940.  J. M. DAYTON  2,204,125
FISHING REEL
Filed June 2, 1939  2 Sheets-Sheet 2

INVENTOR
JAMES M. DAYTON
BY Chapin & Neal.
ATTORNEYS

Patented June 11, 1940

2,204,125

UNITED STATES PATENT OFFICE 2,204,125

FISHING REEL

James M. Dayton, Torrington, Conn.

Application June 2, 1939, Serial No. 277,007

4 Claims. (Cl. 242—84.1)

This invention relates to improvements in fishing reels.

The invention has for one object to provide a reel wherein the spool is supported entirely independently of the cap.

According to prior practice, so far as I am aware, the spool has been supported at one end by a bearing in one end plate of the frame of the reel and at the other end by a bearing in the cap—that part which cooperates with the other end plate of the frame to form a housing for the multiplying gearing. The spool shaft passes through the second end plate without any bearing support therein. Other shafts, such as that carrying the crank and the gear for driving the pinion on the spool, are supported in the second end plate and oftentimes in this end plate only.

The prior art structure described has disadvantages which are largely due to the utilization of the cap as a bearing support for the outer end of the spool. This cap is usually formed of thin pressed metal and is easily bent or dented, if the reel is dropped, with the result that the bearing in the cap may be thrown out of line. The spool may no longer turn freely and the driving gears may no longer mesh properly. Again the cap is removable from the second end plate and it is frequently removed by the user for the purpose of cleaning and lubricating the parts. Once removed, the cap may not be replaced with the accuracy necessary to secure the proper meshing of the gears and the exact alignment of the spool bearings. Also, when the cap is replaced, the retaining screws, when tightened to force the flange of the cap against the second end plate, may cause the cap to be slightly bowed and thus throw the bearings out of line.

The invention seeks to overcome the disadvantages of the prior art construction and eliminate the use of the cap as a support for the spool of the reel. The cap is retained as a cover to house the driving gearing and shaft and to protect the same from injury.

Another object of the invention is to provide in a reel, a frame unit in which the driving shaft for the spool and the crankshaft and also the "level-wind" shaft if desired, are supported together with the gears carried by said shafts. By removing the cap, access is had to the shafts and gears for cleaning and lubrication but the shafts need not be dismounted or the gears moved out of mesh.

Another object of the invention is to provide in a reel a separate and easily removable unit in which all of the spool driving mechanism together with the "level-wind" driving means if desired, is entirely supported, so that all the parts may be assembled with the desired close accuracy by the manufacturer with some assurance that the parts may thereafter remain in accurately assembled relation, or at least that there will be no necessity for the user to disturb the relationship of the parts thus accurately assembled by the manufacturer.

Figure 2:
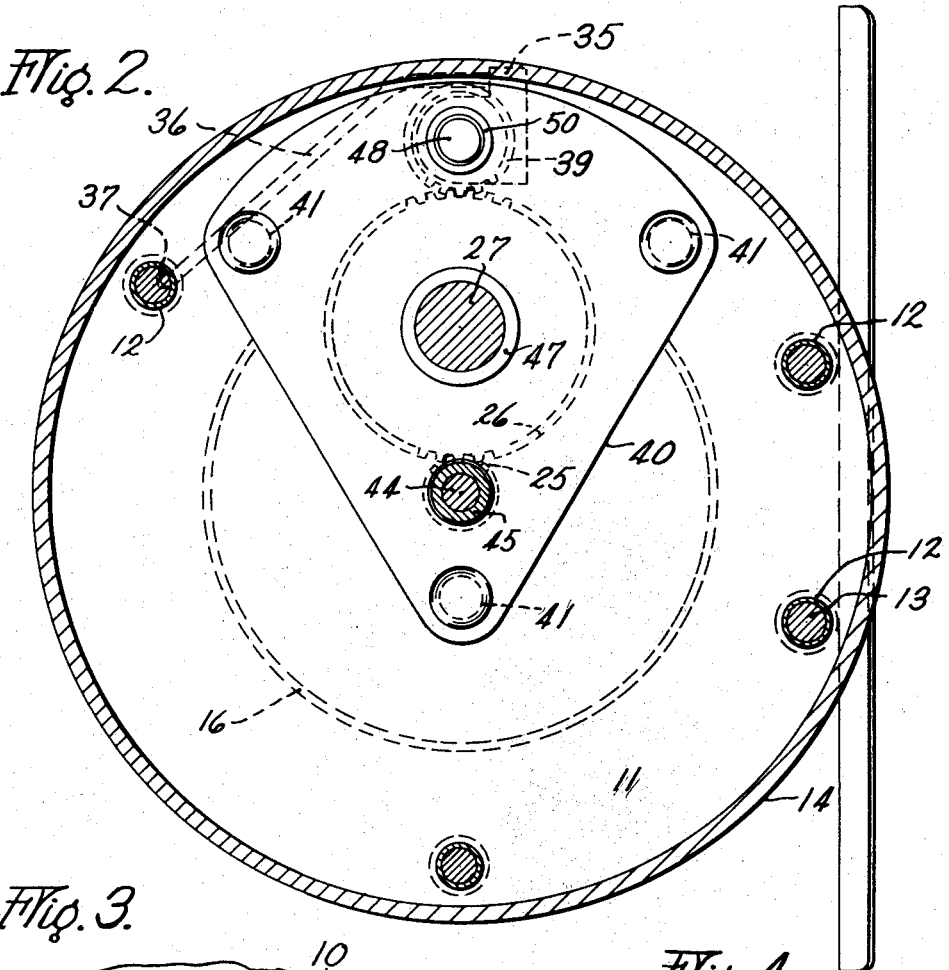
Figure 3:
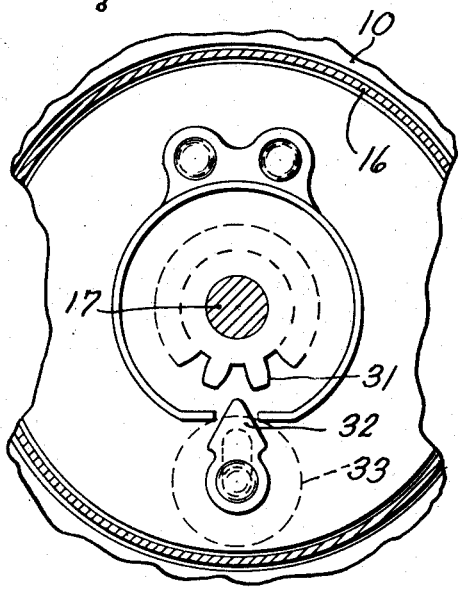
Figure 4:
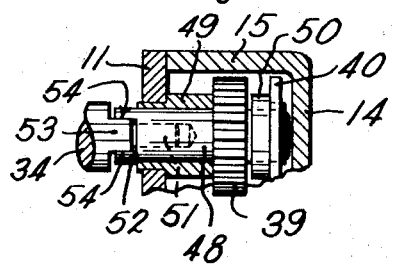

These and other more particular objects will best be understood from the following description taken in connection with the accompanying drawings, in which:

Fig. 1 is an enlarged sectional elevational view of a fishing reel embodying the invention;

Figs. 2 and 3 are cross sectional views taken on the lines 2—2 and 3—3, respectively, of Fig. 1; and Fig. 4 is a fragmentary view showing the detail of one of the shaft couplings.

The fishing reel, shown in these drawings, includes a frame having end plates 10 and 11 (Fig. 1) which are spaced apart by pillars 12 and secured by screws 13 to such pillars. A cap 14, usually a shell drawn from thin sheet metal, cooperates with end plate 11 to form a housing for the multiplying and spool-driving gearing. Some of said screws 13 also serve to hold the cap 14 in place, pressing against the cap and forcing the peripheral flange 15 thereof against the end plate 11 and the latter against its seats on the pillars 12. A spool 16, having a shaft 17, is rotatably supported from bearings 18 and 19 in plates 10 and 11, respectively. The usual jewel end-thrust bearings 20 and 21 are adjustably mounted, as indicated, on threaded sleeves 22 and 23, fixed in plate 10 and cap 14, respectively.

Coupled to the spool shaft 17 is a pinion 25 which is driven by a gear 26 fixed on a shaft 27. The latter extends outwardly through an axial hole 28 in a sleeve 29, fixed to cap 14, and has fixed to its outer end the usual driving crank 30. The hole 28 is substantially larger than shaft 27 so that there is substantial clearance between the shaft and sleeve 29. The bearing support for this shaft is wholly independent of cap 14 as will later appear.

Fixed to one end of shaft 17 (Fig. 1) is a pinion 31 and adjacent thereto is the usual "click" 32 (Figs. 1 and 3) which is pivotally connected to a button 33, mounted in head 10 to slide radially into and out of engagement with the pinion 31 in the well-known manner.

The reel may also be, and preferably is, provided with level wind mechanism of the usual or any suitable form. As herein shown, such mechanism includes a reversely threaded shaft 34 (Fig. 1), and a line guide carriage 35 having threaded engagement therewith and carrying the wire-loop line guide 36. The guide 36 has its outer end slidably engaged in a groove 37 (Fig. 2) in one of the pillars 12 (Fig. 2) to hold the carriage 35 from rotating with the screw. The screw 34 is supported in suitable bearings, such as that shown at 38 on plate 10, and is driven by a pinion 39 from the gear 26, above described.

The mechanism, thus far described, is old and merely forms the background for the present invention. The details of the mechanism shown, while desirable and preferred, are not necessarily essential to the invention and may be varied within wide limits as desired. The particular reel described will serve as an illustrative example of one of many types of fishing reels in which my invention may be embodied.

This invention has to do more particularly with the mounting of the driving mechanism for the spool. All parts of such mechanism are supported independently of the cap 14 and the several shafts are maintained accurately in proper alignment and spacing by mounting them in a separate frame which may be removed and replaced at will without disturbing the relationship of the various gears or their shafts.

As herein shown, the separate frame referred to includes the head 11 and a somewhat smaller plate 40 (Figs. 1 and 2). These two plates are fixed together in parallel relation in any suitable way. For example, three spacing studs 41 may be used. Each stud is fixed at one end to plate 40 (Fig. 1) and its other end passes through a hole in plate 11. The latter seats against a shoulder 42 on the stud and is clamped thereto by the screw 43. By removing the screws 13 which hold the cap 14 in place, the frame comprising the parts 11, 40, and 41, may be removed, carrying with it the gears 25, 26, and 39, and all associated parts, as one unit, without disturbing the relationship between any of the parts.

The pinion 25 is fixed to a short shaft 44, one end of which is adapted to be coupled to the spool shaft 17 and the other end of which is engaged by the above described thrust bearing 21. While the latter bearing is mounted in cap 14 it has no part whatever in supporting the shaft 44 because it merely engages the rounded outer end thereof to take up end thrust. The support for shaft 44 consists of the bearing 19 in plate 11 and a similar and alined bearing 45 fixed in plate 40. Bearing 45 has a part which passes into the sleeve 23 in cap 14 but there is a large clearance between this part and the inner wall of the sleeve. Hence, the positioning of the bearing 45 and thus shaft 44 is not affected by the positioning of the cap 14 or by any ordinary distortion which the cap is likely to undergo, as for example if the reel is dropped and the cap 14 becomes bent or dented. The shaft 27 likewise has bearings 46 and 47, the former being fixed in plate 11 and the latter in plate 40. The gear 39, if used, is fixed to a short shaft 48 which has bearings 49 and 50, one near each end thereof, the bearing 49 being fixed to plate 11 and the bearing 50 being fixed to plate 40.

The shaft 48 is coupled to the screw 34, which it drives, in any suitable way. As shown herein in Figs. 1 and 4, the shaft 49 is bored from one end to provide a bearing to receive the cylindrical end 51 of screw 34 and such end is provided with a diametrical slot 52 to receive and closely fit the slabbed off part 53 of screw 34, which part has parallel walls 54 engaging the walls of slot 52. The part 51 forms a pilot to accurately align the screw with its driving shaft 48 and the relatively non-rotatable parts 52 and 53 provide for the driving engagement between the coupled parts.

The spool 16 is similarly coupled to its driving shaft 44 which is formed in a manner similar to that just described in connection with shaft 48, to receive a pilot 55 and slabbed-off section 17', both fixed to the spool.

The invention provides, as a separate and distinct unit, a frame carrying all the driving shafts and gearing needed for the reel. This unit is removable and replaceable at will and with ease and convenience. One simply removes the crank 30 and those screws 13 which hold the cap 14 in place, whereupon the cap may be removed from said unit and the latter lifted free from the pillars 12, the spool 16 and level-wind shaft 34 becoming disconnected at the couplings described. To the manufacturer, the invention has the advantage that he is enabled to mount all parts of the driving mechanism in a separate frame unit and to fit them with close accuracy so that the gears mesh perfectly and the shafts are maintained in exact parallelism. This unit is one which need not ordinarily be taken apart by the user of the reel, as is the case with the usual reel, wherein the cap forms an element of the frame. The parts, initially assembled with the necessary nicety and close accuracy, are likely to remain indefinitely in such relation for several reasons. First, the removal of the cap does not, as heretofore, take away any of the bearing supports for the driving mechanism. Second, it is not necessary to take the mechanism apart to lubricate it. Third, the cap serves to protect the driving mechanism from mechanical injury.

The invention also enables repairs to be made in a simple and satisfactory manner. The user can remove the unit with all the driving mechanism thereon, and substitute a new unit with the assurance that it will function properly. In the prior practice, the substitution of a new shaft or a new gear by the user did not always prove satisfactory. Some fitting by an expert might be required to get the shaft mounted properly or the gear meshed properly with its mate.

Thus, the invention offers an improved unit driving mechanism for a fishing reel and such mechanism is easily removable and replaceable whenever necessary and does not have to be taken apart in order to lubricate the parts. Furthermore, the unit enables the parts to be assembled properly and with precision and maintained in accurately assembled relation. Moreover, and this is of great importance, the invention provides for the support of all parts of the driving mechanism, and more particularly of the outer bearing of the spool shaft, wholly independently of the cap.

What I claim is:

1. In a fishing reel, wherein the spool is mounted between two axially-spaced and rigidly-interconnected end-plates and wherein the spool is driven by a crank and transmission means actuated by the crank, a cap cooperating with one end plate for enclosing said means, a third plate fixed to the last-named end plate and forming therewith a sub-frame unit, said means including a driving shaft for the spool rotatably mounted entirely in said unit and a shaft for said crank also rotatably mounted entirely in said unit.

2. In a fishing reel, wherein the spool is mounted between two axially-spaced and rigidly-interconnected end plates and wherein the spool and level-wind mechanism are driven by a crank and transmission means actuated by said crank, a cap cooperating with one end plate for enclosing said means, a third plate fixed to the last-named end plate and forming therewith a sub-frame unit, said means including a driving shaft for the spool, a driving shaft for said mechanism and a shaft for said crank, all said shafts being rotatably mounted in and entirely supported in said unit.

3. In a fishing reel, a frame including an end plate and a sub-frame unit secured to said frame in a manner to enable convenient removal and axially spaced from said plate, a crankshaft rotatably mounted and entirely supported in said unit, a driving gear on said crankshaft, a pinion driven by said gear, a shaft carrying said pinion and rotatably mounted and entirely supported in said unit, a spool located between said plate and unit and having one end rotatably mounted in said plate, said pinion shaft having coupling means engageable with the other end of said spool for driving and supporting the same, and a cap cooperating with said unit to house said gears and shafts.

4. In a fishing reel, a frame including an end plate and a sub-frame unit secured to said frame in a manner to enable convenient removal and axially spaced from said plate, a crankshaft rotatably mounted and entirely supported in said unit, a driving gear on said crankshaft, a pinion driven by said gear, a shaft carrying said pinion and rotatably mounted and entirely supported in said unit, a spool located between said plate and unit and having one end rotatably mounted in said plate, said pinion shaft having coupling means engageable with the other end of said spool for driving and supporting the same, a second shaft rotatably mounted and entirely supported in said unit, a pinion on the second shaft meshing with said gear, level-wind means rotatably mounted at one end in said plate, said second shaft having coupling means engageable with the other end of said means for driving and supporting the same, and a cap cooperating with said unit to house said gears and shafts.

JAMES M. DAYTON.